Aug. 29, 1944. B. P. POND 2,357,021
MOTOR
Filed May 21, 1942
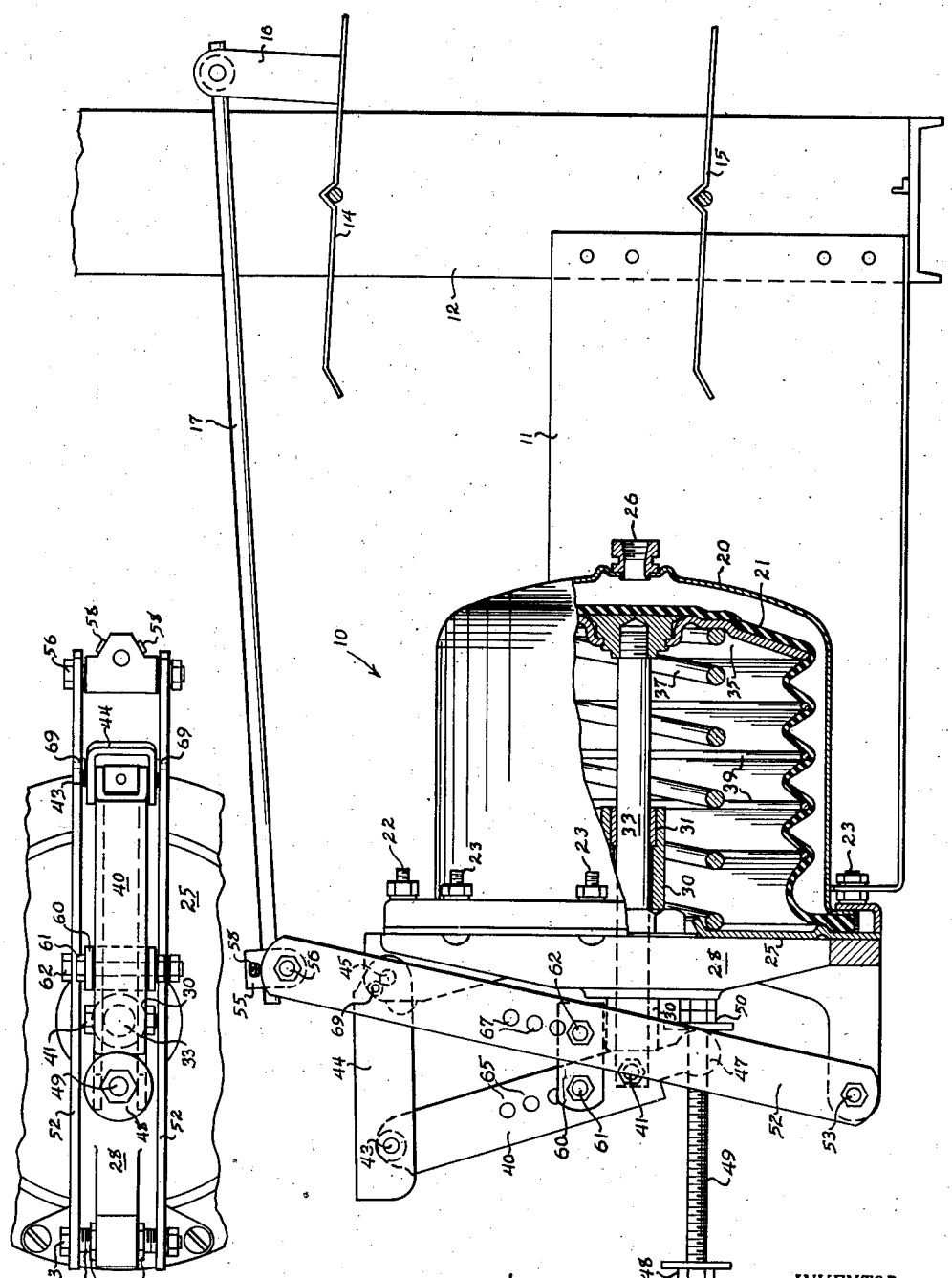
INVENTOR.
BY Bertram P. Pond
George H. Fisher
Attorney Patented Aug. 29, 1944

2,357,021

UNITED STATES PATENT OFFICE 2,357,021

MOTOR

Bertram P. Pond, River Forest, Ill., assignor to Minneapolis-Honeywell Regulator Company, Minneapolis, Minn., a corporation of Delaware Application May 21, 1942, Serial No. 443,885

9 Claims. (Cl. 74—103)

The present invention relates to motors adapted to position various controlled devices and is more particularly directed to motors of the fluid pressure actuated type.

An object of the invention is to provide a motor of the reciprocating type in which the relation between the relative movements of driving and driven members may be varied.

Another object of the invention is to provide a fluid pressure actuated motor employing a piston or bellows having a predetermined stroke and having a linkage which may be adjusted in order that substantially the full bellows stroke may be employed regardless of the range of movement of the equipment being driven thereby.

Another object is the provision of the type of motor linkage mentioned above which may be embodied in a very compact arrangement.

A further object is the provision of a motor linkage in which a power take-off arm is guided against lateral deflection.

Other objects will be apparent from the specification, and from the drawing, in which Figure 1 is a view of a pneumatically operated damper motor embodying my invention, portions of which are shown in section, and Figure 2 is an end view of the linkage of the motor shown in Figure 1.

Referring to the drawing, the damper motor shown generally at 10 is mounted by means of an angle bracket 11 to the frame 12 of louver type damper. The frame 12 is of rectangular form and is provided with louvers 14 and 15 pivoted therein for varying the free area through the frame. The louver 14 is provided with an arm 16 to which is pivotally secured a damper actuating rod 17. The louvers 14 and 15 and other louvers parallel thereto may be interconnected by any suitable cross-connecting means (not shown), so that they will be positioned together.

The motor 10 is of the bellows type and is adapted to be actuated by changes in air pressure applied to a bellows chamber. A rigid cup 20 has a flexible bellows 21 mounted therein and both the cup 20 and the bellows 21 are secured together by means of screws 22 and 23 which clamp both the cup 20 and the bellows 21 to a face plate 25 so as to form a pressure type seal between the cup 20 and the bellows 21. Certain of the screws 23 additionally serve to support the motor 10 on the angle bracket 11, and any of the screws 22 and 23 may be used for the purpose of mounting the motor in any desired manner. The cup 20 is provided with a pipe connection 26 by means of which the motor may be connected to any suitable device for varying air pressure. This device may be a thermostat of the pneumatic type. A casting 28 is also secured to the face plate 25 by means of the screws 22 and 23. The casting 28 serves as a support for the motor linkage which will be hereinafter described and also carries a centrally located guide member 30 which extends inside the bellows 21 to carry an inner bearing 31 for a driving member or rod 33. The outer end of guide member 30 is provided with a bearing for the rod 33 which is similar to the inner bearing 31. At its inner end the rod 33 carries a pressure plate 35 which rests against the inner surface of the bellows 21 and serves to transmit the force applied thereto to the rod 33. A compression spring 37 extends between the face plate 25 and the pressure plate 35 and is of such a design that when there is zero air pressure on the bellows 21 there is some force exerted tending to move the rod 33 toward the right, as seen in Figure 1. It is common in devices of this type to select a compression spring which has an initial tension corresponding to approximately three pounds air pressure. The bellows 21 is provided with metal rings 39 on its interior surface which prevent collapse of the bellows when pressure is applied thereto.

The casting 28 also serves as a support for the motor linkage by means of which movements of the bellows 21 and the rod 33 are transmitted to the damper actuating rod 17. The driving rod 33 is guided in a straight line by the guide member 30 and assumes a position at which the force of the spring 37 just balances the effect of air pressure on the bellows 21. Movement of the rod to the left is limited by engagement between the guide member 30 and the center portion of the pressure plate 35, while movement to the right is limited by engagement between the outer end of the guide member 30 and a driving lever 40 to which the rod 33 is pivoted. A screw 41 serves to pivot the lever 40 to the rod 33. The upper end of the driving lever 40, as seen in Figure 1, is pivoted on a pin 43 which is carried on the outer end of an arm 44. The arm 44 is pivoted to the casting 28 on a pin 45. As a further means of limiting the movement of the rod 33 the driving lever 40 is provided with a lower extension 47 which is adapted to engage a pair of nuts 48 which may be adjusted on a screw threaded rod 49 to limit the outward movement of the rod 33. The rod 49 is carried by the casting 28. In a similar manner a pair of stop nuts 50 may be adjusted on the rod 49 to limit inward movement of the driving rod 33. It is the purpose of the stop nuts 48 and 50 to accurately adjust motor travel so that the device being controlled will be moved only between predetermined limiting positions.

A driven lever 52 is pivoted in the casting 28 by means of a pin 53. A bearing 54 for the pin 53 is screw threaded in a portion of the casting 28 and is provided with lock nuts 54a to lock the bearing in a position in which the lever 52 will be in alignment with the remainder of the motor linkage. The upper end of the lever 52 is pivotally connected to the damper actuating rod 17 by means of a block 55 which is pivoted to the lever 52 on a screw 56. A pair of set screws 58 serve to clamp the rod 17 in the block 55 at any desired position. A link in the form of a clevis 60 is pivotally connected to the driving lever 40 on a screw 61 and pivotally connected to the driven lever 52 on a screw 62. The driving lever 40 is provided with a plurality of holes 65 through which the pin 61 may be passed to connect the lever 40 and the clevis 60 and the driven lever 52 is likewise provided with a plurality of holes 67 through which the screw 62 may be passed to connect the lever 52 to the clevis 60. It will be noted that when the clevis 60 is moved from the position shown and the pins 61 and 62 inserted in corresponding pairs of holes 65 and 67 which are farther away from the rod 33, that the movement of the driven lever 52 relative to movements of the rod 33 will be correspondingly reduced. Minimum movement of the lever 52 will, of course, be obtained when the clevis 60 is located in its uppermost position as seen in Figure 1. When a damper motor of this type is used to position various devices such as the damper shown, it is desirable that small changes in air pressure applied to the bellows will be reflected in corresponding movements of the controlled device. In order to obtain a maximum power from the motor, it is desirable that the bellows should travel through substantially its entire range of movement when the controlled device is moving through its complete range of movement. Only in this way may the entire capability of the motor be utilized. The present invention provides a linkage which may be adjusted through a wide range to provide for full bellows movement corresponding to various movements of the driven lever 52.

In order to provide a very compact and simple structure the driven lever 52 is formed of two parallel strips as seen in Figure 2. By constructing the lever 52 in bifurcated form it is possible to locate the driving lever 40, the arm 44, and the clevis 60 between the two portions of the lever 52 in such a way that the lever 52 passes back and forth over these members as the bellows 21 expands and contracts. The construction is such also, that the linkage is symmetrical (see Figure 2) about the driving rod 33 and the damper actuating rod 17 so that there is no tendency for any of the levers to twist as force is applied thereto.

In any installation of the motor 10, it is probable that there will be a certain amount of side thrust on the lever 52, that is, force normal to the pivotal movement of that lever. The arm 44 is so constructed that it has two flat surfaces (see Figure 2) which lie in planes perpendicular to the axis on which the lever 52 is pivoted. The lever 52 is provided with a pair of buttons 69 which lies adjacent the flat surfaces of the arm 44 and are adapted to engage these surfaces when any side thrust is placed on the lever 52. The buttons 69 are so located and the arm 44 is so shaped that the lever 52 will be supported laterally thereby at all possible positions. The bearing 54 for the pin 53 on which the lever 52 is carried is adjusted laterally so that the buttons 69 and the arm 44 are in the proper relation. This linkage enables the linkage as a whole to be constructed in a very compact manner and at the same time provides for a mechanism which is amply rigid.

It will be noted that the linkage is so constructed that no force due to the angular position of the damper actuating rod 17 will be transmitted to the driving rod 33. This structure greatly reduces the side thrust and friction on the rod 33 and thereby enables the motor to respond more readily to small changes in air pressure applied to the bellows 21. This construction also increases the life of the device materially.

It will be seen that I have provided a very simple and compact motor linkage and one in which adjustment may be made between the relative movements of the driving rod and the lever which serves as the power take-off from the motor. Various modifications of this mechanism will be apparent to those skilled in the art, the present embodiment being merely illustrative. I desire, therefore, to be limited only by the scope of the appended claims.

I claim as my invention:

1. In combination, a reciprocable driving member, motor means for reciprocating said member, a support, a driven lever pivoted in said support at a point spaced from said driving member, an arm having a first end pivotally attached to said support at a second point spaced from said driving member and on the opposite side thereof from the first mentioned point, a driving lever pivoted at one end to the second end of said arm and having its other end pivoted to said driving member, and means for transmitting force from said driving lever to said driven lever.

2. In combination, a driving member movable in a straight line, motor means for translating said member, a support, a driven lever pivoted in said support, an arm having a first end pivotally attached to said support, a driving lever pivoted at one end to the second end of said arm and having its other end pivoted to said driving member, and means for transmitting force between said driving lever and said driven lever, said force transmitting means being simultaneously adjustable lengthwise of said levers and in opposite directions relative to their pivots to said support and said arm respectively for varying the angular movement of said driven lever relative to the travel of said driving member.

3. In combination, a reciprocable driving member, motor means for reciprocating said member, a support, a driven lever pivotally connected to said support and extending in one direction therefrom, a driving lever pivotally connected at one end to said support, extending in the opposite direction therefrom and connected at its other end to said driving member, and means for transmitting force between said driving lever and said driven lever, said force transmitting means being adjustable lengthwise of adjacent points on both of said levers for varying the angular movement of said driven lever relative to the travel of said driving member.

4. In combination, a reciprocable driving member, motor means for reciprocating said member, a support, a driven lever pivoted in said support, an arm having a first end pivotally attached to said support, a driving lever pivoted at one end to the second end of said arm and having its other end pivoted to said driving member, a link, a connection between one end of said link and an intermediate point on said driving lever, a connection between the other end of said link and said driven lever, and means for adjusting both of said connections for varying the angular movement of said driven lever relative to the travel of said driving member.

5. In combination, a reciprocable driving member, motor means for reciprocating said member, a support, a driven lever pivoted in said support, an arm having a first end pivotally attached to said support, said arm being adapted to engage said driven lever to prevent deflections of said lever normal to the path of angular movement thereof, a driving lever pivoted at one end to the second end of said arm and having its other end pivoted to said driving member, and means for transmitting force between said driving lever and said driven lever, said force transmitting means being adjustable lengthwise of said levers for varying the angular movement of said driven lever relative to the travel of said driving member.

6. In combination, a reciprocable driving member, motor means for reciprocating said member, a support, a driven lever pivotally connected to said support, an arm mounted on said support and being adapted to engage said driven lever to prevent deflections thereof normal to the path of angular movement thereof, a driving lever pivoted at one end to the outer end of said arm and connected at its other end to said driving member, and means for transmitting force from said driving lever to said driven lever.

7. In combination, a reciprocable driving member, motor means for reciprocating said member, a support, a driven lever pivoted in said support, an arm having a first end pivotally attached to said support, the pivot connection preventing swinging of said arm in the plane of the pivot connection, said arm being adapted to engage said driven lever to prevent deflections of said lever normal in the plane of the movement thereof, a driving lever pivoted at one end to the second end of said arm and having its other end pivoted to said driving member, and means for transmitting force between said driving lever and said driven lever.

8. In combination, a reciprocable driving member, motor means for reciprocating said member, a support, a bifurcated driven lever pivoted in said support, an arm having a first end pivotally attached to said support, said arm lying between the bifurcated portions of said driven lever and being adapted to engage the bifurcated portions of said driven lever to prevent deflections of said lever normal to the path of angular movement thereof, a driving lever pivoted at one end to the second end of said arm and having its other end pivoted to said driving member, and means for transmitting force between said driving lever and said driven lever, said force transmitting means being adjustable lengthwise of said levers for varying the angular movement of said driven lever relative to the travel of said driving member.

9. In combination, a reciprocable driving member, motor means for reciprocating said member, a support, a bifurcated driven lever pivoted in said support, an arm having a first end pivotally attached to said support, said arm lying between the bifurcated portions of said driven lever and being adapted to engage the bifurcated portions of said driven lever to prevent deflections of said lever normal to the path of angular movement thereof, a driving lever pivoted at one end to the second end of said arm and having its other end pivoted to said driving member, and means for transmitting force between said driving lever and said driven lever.

BERTRAM P. POND.